(12) United States Patent
Sacle et al.

(10) Patent No.: US 8,447,442 B2
(45) Date of Patent: May 21, 2013

(54) METHOD FOR ASSISTING IN REJOINING A VERTICAL DESCENT TRAJECTORY AND ASSOCIATED DEVICE

(75) Inventors: Jérôme Sacle, Toulouse (FR); Christophe Caillaud, Blagnac (FR); Lionel Verot, Blagnac (FR)

(73) Assignee: Thales, Neuilly sur Seine (FR)

( * ) Notice: Subject to any disclaimer, the term of this patent is extended or adjusted under 35 U.S.C. 154(b) by 303 days.

(21) Appl. No.: 12/958,820

(22) Filed: Dec. 2, 2010

(65) Prior Publication Data
US 2011/0137495 A1    Jun. 9, 2011

(30) Foreign Application Priority Data
Dec. 4, 2009  (FR) ...................................... 09 05872

(51) Int. Cl.
*G05D 1/00*  (2006.01)
*G08G 5/02*  (2006.01)
*G06F 19/00* (2006.01)

(52) U.S. Cl.
USPC ......... 701/3; 701/7; 701/9; 701/15; 244/76 R

(58) Field of Classification Search
USPC .... 701/3, 4, 7, 14, 9, 15, 8, 18, 120; 244/765, 244/180
See application file for complete search history.

(56) References Cited

U.S. PATENT DOCUMENTS

| | | |
|---|---|---|
| 5,739,770 A | 4/1998 | Liden |
| 2008/0262665 A1 | 10/2008 | Coulmeau et al. |
| 2009/0043434 A1* | 2/2009 | Deker .............................. 701/16 |
| 2009/0112535 A1* | 4/2009 | Phillips .............................. 703/2 |
| 2009/0314897 A1* | 12/2009 | Boissenin et al. ............. 244/186 |
| 2010/0004801 A1* | 1/2010 | Flotte et al. ....................... 701/8 |
| 2010/0125382 A1* | 5/2010 | Wachenheim et al. ......... 701/18 |

FOREIGN PATENT DOCUMENTS

FR    2 915 304 A1    10/2008

* cited by examiner

*Primary Examiner* — Tan Q Nguyen
(74) *Attorney, Agent, or Firm* — Baker Hostetler LLLP

(57) ABSTRACT

A method is provided for assisting in rejoining a vertical descent trajectory that an aircraft is assumed to have to follow, using a flight management system FMS embedded onboard the aircraft, and includes the following steps: calculation of a vertical deviation VDEV, in the vertical plane, between the aircraft and the vertical descent trajectory, and comparison between the vertical deviation VDEV and a predetermined deviation threshold SVDEV; when the vertical deviation VDEV reaches the deviation threshold SVDEV, a step during which the activation of an optimized mode for catching up on the vertical descent trajectory is authorized; if the optimized mode for catching up on the vertical descent trajectory is activated, piloting of the aircraft by the flight management system FMS in optimized catch-up mode, that is to say at minimum thrust with a target rejoining speed in level VCRP and a target rejoining speed in downward trajectory, the target rejoining speed in level VCRP being equal to the maximum L/D ratio speed of the aircraft uprated by a first value V1 of between 5 and 15 knots, and the target rejoining speed in downward trajectory VCRD being equal to the maximum operating speed VMO with which the aircraft is allowed to fly downrated by a second value V2 of between 3 and 10 knots, a knot being equal to 0.514 ms$^{-1}$.

14 Claims, 4 Drawing Sheets

METHOD FOR ASSISTING IN REJOINING A VERTICAL DESCENT TRAJECTORY AND ASSOCIATED DEVICE

CROSS-REFERENCE TO RELATED APPLICATION

This application claims priority to foreign French patent application No. FR 0905872, filed on Dec. 4, 2009, the disclosure of which is incorporated by reference in its entirety.

FIELD OF THE INVENTION

The invention relates to the field of aircraft navigation aid. Conventionally, aircraft are equipped with a flight computer called Flight Management System, better known by the acronym FMS. The FMS is able to generate a flight plan defining the route that the crew of an aircraft plans to use to go from a departure position to a destination point, and the travel conditions of this route. The route comprises a vertical trajectory and a lateral trajectory (respectively in the vertical plane and in the horizontal plane) and a speed profile. The speed profile is the set of values, taken along the route, by the speed component of the aircraft relative to air in the horizontal plane. Hereinafter in the text, the term "speed" should be understood to mean the air speed component of the aircraft in the horizontal plane. The flight plan is calculated by considering a speed associated with each flight phase (take-off, cruising, descent, approach, landing). The speed associated with a flight phase corresponds to a CAS/MACH pairing. It is programmed for a given flight speed. The CAS and MACH relating to a flight phase vary if necessary according to the altitude and depend on an economic optimization criterion called Cost Index determined by the operator, the mass of the aircraft, the altitude and the temperature. The cost index is a criterion for optimization between costs of time CT and costs of fuel CF. Hereinafter in the text, we will use the expression "descent flight plan" to designate the portion of the flight plan extending between a horizontal start-of-descent position (in the horizontal plane) and a horizontal end-of-descent position that are predetermined. The descent flight plan comprises a vertical trajectory, a lateral descent trajectory and a descent speed. The term "descent phase" designates the period during which the aircraft is, on the lateral descent trajectory, between the horizontal start-of-descent position and the horizontal end-of-descent position.

The operational context of the present invention is situated during a descent phase in controlled air spaces with high traffic density. Air Traffic Control ATC may send the FMS of an aircraft flight instructions temporarily prohibiting it from following a downward trajectory if an aeroplane is located close by at a lower altitude, in order to satisfy an adequate spacing constraint between two aircraft. Since the aircraft is temporarily constrained to follow a level (that is to say, adopt a horizontal trajectory), a vertical deviation (in other words, a deviation in the vertical plane) appears between the aircraft and the vertical descent trajectory at the horizontal position occupied by the aircraft.

BACKGROUND OF THE INVENTION

Conventionally, when the aircraft receives, during the cruising phase when it is following the cruising level with a fixed cruising speed, a flight instruction prohibiting it from adopting a downward trajectory, the flight management system FMS guides the aircraft on the cruising level by maintaining the cruising speed. When the aircraft is allowed to follow a downward trajectory, the FMS operates in vertical descent trajectory catch-up mode. There are various vertical descent trajectory catch-up modes, including a catch-up mode at minimum thrust with a target speed for catching up in level VCRP and a target speed for catching up in downward trajectory VCRD. When the FMS operates according to this catch-up mode, it sets the thrust of the engines and the control surfaces of the aircraft as follows: when the aircraft is constrained to follow a level, the FMS sets the position of the control surfaces to guide the aircraft to a level and sets the thrust of the engines to its idle level when the speed V of the aircraft is greater than a target rejoining speed in level VCRP, and it adapts the thrust of the engines to keep the speed equal to the target rejoining speed in level VCRP when the speed of the aircraft reaches the target rejoining speed in level VCRP. When the aircraft is allowed to follow a downward trajectory, the FMS sets the thrust of the engines to its idle level and sets the control surfaces so that the aircraft makes up, by accelerating, a target rejoining speed in descent VCRD. In other words, the FMS sets the pitch angle of the aircraft so that it accelerates to a target rejoining speed in descent VCRD then maintains this target speed.

When the aircraft has rejoined the vertical descent trajectory, the FMS returns the speed of the aircraft to the descent speed value so that the aircraft rejoins the descent flight plan.

However, in vertical descent trajectory catch-up mode, the FMS varies the speed of the aircraft over a small speed range around the descent speed. In practice, conventionally, the target rejoining speed in level VCDP, respectively the target rejoining speed in descent VCRD, is equal to the descent speed downrated, respectively uprated, by 20 knots. When the aircraft is constrained to remain for a long time on a level, a very wide excursion of the aircraft above the vertical descent trajectory may be generated. In this case, the piloting of the FMS in catch-up mode does not enable the aircraft to rejoin the descent flight plan early enough before the approach phase to guarantee the success of the approach phase. Quite often, for the aircraft to catch up on the descent flight plan, the pilot is constrained to manually use the air brakes. However, the air brakes are great consumers of energy. This unnecessary consumption results from poor speed management. The air brakes also generate vibrations that are uncomfortable for the passengers. Another solution for rejoining the descent flight plan entails manually piloting the aircraft. This type of piloting presents the drawback of representing a significant workload for the crew which is already stressed in a descent phase.

SUMMARY OF THE INVENTION

The present invention provides a navigation aid method making it possible, when, in the descent phase, the aircraft is departing from the vertical descent trajectory, to ensure that the descent trajectory is caught up on rapidly while ensuring maximum comfort for the passengers and while minimizing fuel consumption, without increasing the pilot's workload.

To this end, one subject of the invention is a method for assisting in rejoining a vertical descent trajectory that an aircraft is assumed to have to follow, said method using a flight management system FMS embedded onboard the aircraft and comprising the following steps:

calculation of a vertical deviation VDEV, in a vertical plane, between the aircraft and the vertical descent trajectory, comparison between the vertical deviation VDEV and a predetermined deviation threshold SVDEV, when the vertical deviation VDEV reaches the deviation threshold SVDEV, a step during which the activation of an optimized mode for catching up on the vertical descent trajectory is made possible, if the optimized mode for catching up on the vertical descent trajectory is activated, piloting of the aircraft by the flight management system FMS in optimized catch-up mode, that is to say at minimum thrust with a target rejoining speed in level VCRP and a target rejoining speed in downward trajectory, the target rejoining speed in level VCRP being equal to the maximum L/D ratio speed of the aircraft uprated by a first value V1 of between 5 and 15 knots, and the target rejoining speed in downward trajectory VCRD being equal to the maximum operating speed VMO downrated by a second value V2 of between 3 and 10 knots, a knot being equal to $0.514$ $ms^{-1}$.

The method according to the invention may comprise one of the following characteristics taken on its own or in combination:

the deviation threshold SVDEV is inversely proportional to the speed of variation of the deviation VVDEV, the step during which the activation of an optimized catch-up mode is made possible is a step for providing the crew with a manual means of activating an optimized mode for catching up on the vertical descent trajectory, it comprises at least one step for activating the optimized mode for catching up on the vertical descent trajectory, in case of activation, it comprises a step for providing the crew with a manual means of deactivating the optimized catch-up mode, the step during which the activation is made possible is a step for automatic activation of the optimized mode for catching up on the vertical descent trajectory, it comprises at least a step for eliminating the manual activation means in case of activation of the optimized catch-up mode and/or a step for eliminating the manual activation means when the aircraft rejoins the vertical descent trajectory, it comprises a step for automatically deactivating the optimized catch-up mode when the aircraft rejoins the vertical descent trajectory while the optimized catch-up mode is activated and/or at least one step for manually deactivating the optimized catch-up mode by means of a manual deactivation means, in case of manual deactivation of the optimized mode for catching up on the vertical descent trajectory, when the aircraft has not rejoined the vertical descent trajectory, there is a return to the step for provision of the activation means, the step for providing the crew with a means of activating an optimized mode for catching up on the vertical descent trajectory comprises a step for displaying, in a first area of a screen of a data display and input console MCDU also comprising a keyboard, a first information item informing the crew that it can activate an optimized catch-up mode and a step for configuring the first area so that, when the crew selects the first area by means of the keyboard, the optimized catch-up mode is activated, the step for providing a means of deactivating the optimized catch-up mode comprises a step for displaying, in a second area of a screen of a data display and input console MCDU also comprising a keyboard, a second information item informing the crew that it can activate an optimized catch-up mode, and a step for configuring the second area so that, when the crew selects the second area by means of the keyboard, the optimized catch-up mode is activated, if the optimized catch-up mode is activated, the flight management system FMS calculates, when the aircraft is level, a maximum horizontal start-of-slope position from which the aircraft must begin to adopt a downward trajectory to be able to rejoin a next waypoint WP of the flight plan, with altitude constraint, by being piloted in optimized mode for catching up on the vertical descent trajectory, and displays, on a navigation screen, the maximum start-of-slope position PM.

Another subject of the invention is a method for assisting in rejoining a descent flight plan comprising a vertical descent trajectory and a lateral descent trajectory comprising the steps of a method for assisting in rejoining a vertical descent trajectory comprising a step for decelerating to the descent speed when the aircraft has rejoined the vertical descent trajectory. Another subject of the invention is a method according to the invention.

The method according to the invention makes it possible to rejoin the vertical descent trajectory over a minimum ground distance, at little cost, with little stress to the crew. In practice, the method according to the invention makes it possible to limit the deviation between the aircraft and the vertical descent trajectory from the start of the descent phase even if the aircraft has not begun the descent, when the optimized catch-up mode has been activated. The aircraft offers a wide speed-reduction margin on levels and can accelerate, in downward trajectory, over a wide range of speeds which enables it to converge effectively towards the vertical trajectory of the descent flight plan. Moreover, this method makes it possible to catch up on the descent flight plan with an engine speed set to idle for as long as possible, which generates fuel savings. Furthermore, since it is anticipative and uses accelerations over wide speed ranges, it minimizes the use of the air brakes for catching up on the descent flight plan. Implementing this method is inexpensive; it requires only a specific programming of the flight management system.

BRIEF DESCRIPTION OF THE DRAWINGS

Other features and advantages of the invention will become apparent from reading the following detailed description, given as a nonlimiting example, and with reference to the appended drawings in which.

DETAILED DESCRIPTION

Figure 1:
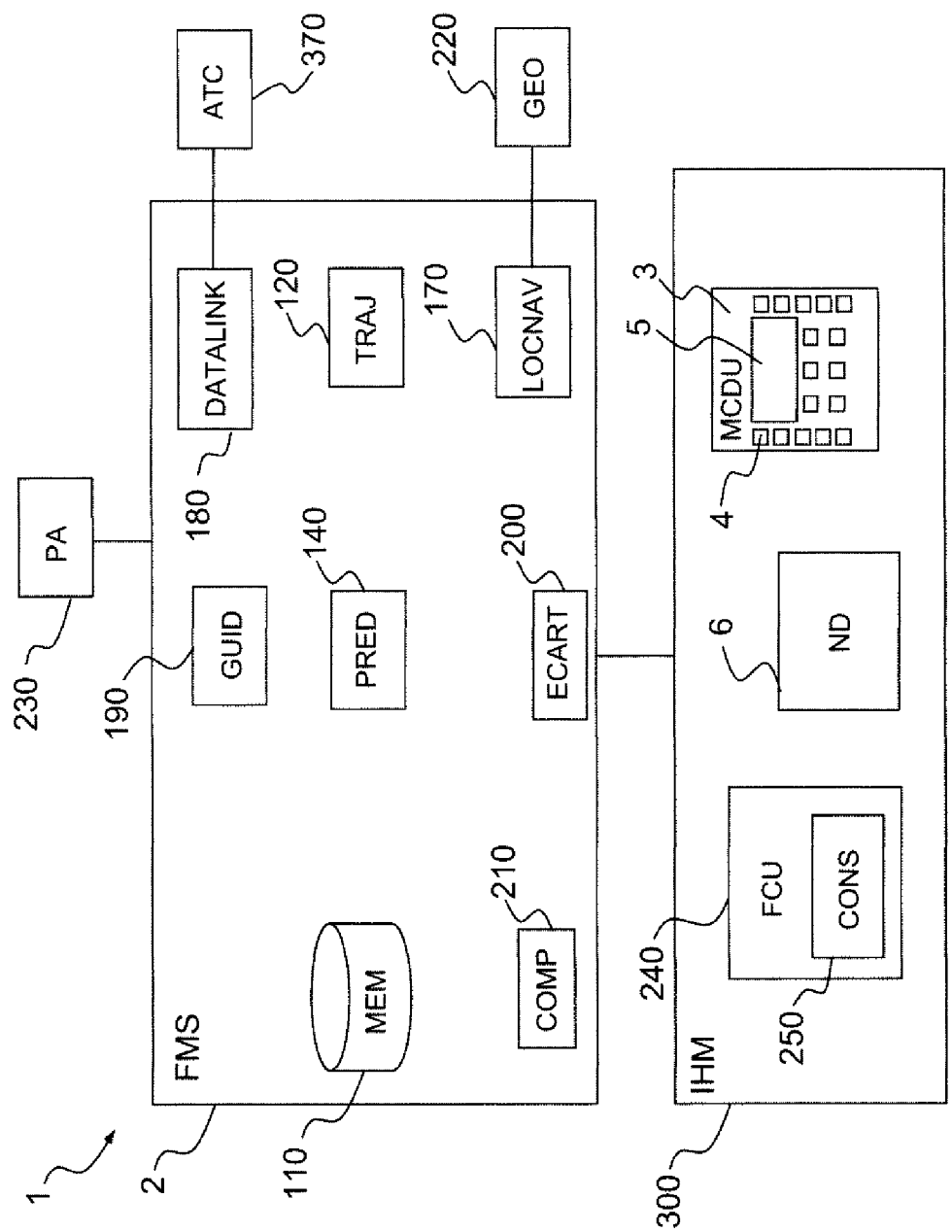
FIG. 1 diagrammatically represents an aircraft navigation aid device.

Conventionally, an aircraft is equipped with a navigation aid device 1 embedded onboard the aircraft as represented in FIG. 1, comprising a flight management system FMS, 2 (or flight computer), conventionally comprising:

location means LOCNAV, 170, for locating the aircraft, by calculating the position POS and the speed V of the aircraft, based on information transmitted by geolocation means GEO, 220;

means 110 MEM for storing flight parameters comprising geographic elements of the flight plan, forming the skeleton of the route to be followed, standardized data essential to the construction of the flight plan, aerodynamic and engine parameters of the aircraft representative of the aircraft performance characteristics, calculation modules 120, 140 for constructing the flight plan, from data stored in the storage means MEM 110, said calculation means 120, 140 comprising a module for constructing a lateral trajectory TRAJ, 120, for constructing a continuous lateral trajectory from the data stored in the storage means MEM 110, and comprising a module for constructing a vertical trajectory PRED, 140 for constructing a vertical trajectory optimized to the lateral trajectory and observing the constrains stored in the storage means MEM 110, a guidance module GUID 190, for generating guidance commands making it possible to guide the aircraft in the horizontal and vertical planes along the flight plan, while optimizing its speed, a digital datalink system DATLINK 180, enabling the flight management system FMS, 2, to communicate with air traffic control stations ATC, 370.

The flight management system FMS, 2, also comprises calculation means ECART, 200, for calculating, at regular time intervals, the vertical deviation VDEV defined previously between the aircraft and the vertical descent trajectory. A flight management system also conventionally comprises comparison means COMP, 210, for regularly comparing the vertical deviation VDEV to a predetermined deviation threshold SVDEV.

The flight management aid device comprises, linked to the flight management system FMS, 2, a human-machine interface IHM 300 comprising:

a flight control box, or flight control unit FCU, 240, comprising means CONS, 250, for sending flight instructions to the flight management system, FMS, 2, a data display and input console, or multipurpose control display unit, MCDU, 3, comprising a screen 5 enabling the FMS to communicate information to the crew and manual input means 4, enabling the crew to transmit data to the flight management system FMS, 2, a navigation screen ND, 6, able to display elements of the flight plan, an automatic piloting device PA, 230, via which the FMS, 2, is able to pilot the aircraft when the latter is configured in automatic piloting mode. More specifically, the guidance module GUID, 190 of the FMS, 2, transmits guidance commands comprising, for example, speed, thrust, and slope instructions and the automatic piloting device interacts with a flight control computer which controls the control surfaces so that the aircraft follows the speed instruction and with an engine computer which controls the thrust of the engines so that the aircraft follows a speed instruction or a thrust instruction. In a variant, the FMS transmits the speed and thrust instructions to an auto-thrust device, not represented, which sets the thrust of the engines via the engine computer. The pilot automatically sets the control surfaces to satisfy the guidance instruction. A control loop servocontrols the thrust of the engines and the setting of the control surfaces to the guidance instructions.

Figure 2:
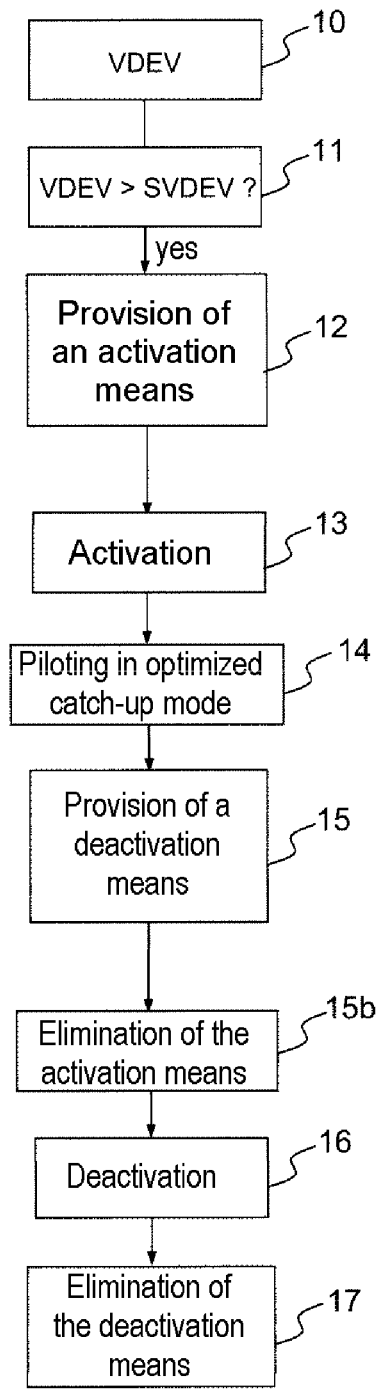
FIG. 2 represents the steps of a first embodiment of the method according to the invention.

FIG. 2 shows steps of a first embodiment of the method for assisting in catching up on the vertical descent trajectory according to the invention. The method is implemented in the descent phase. It comprises the following steps:

calculation 10, by means of the flight management system FMS, 2, of a vertical deviation VDEV, between the aircraft and the vertical descent trajectory, comparison 11, by means of the flight management system FMS, 2, of the vertical deviation VDEV with a predetermined vertical deviation threshold SVDEV, when the vertical deviation VDEV exceeds the vertical deviation threshold SVDEV, a step 12 during which the activation of an optimized mode for catching up on the vertical descent trajectory is authorized, if the optimized catch-up mode is activated 13, by the crew, a step 14 for optimized catching up on the vertical descent trajectory, as defined previously, during which the FMS, 2, pilots the aircraft in vertical descent trajectory catch-up mode with a minimum engine thrust, a target speed for catching up in level VCRP and a target speed for catching up in downward trajectory VCRD. In the method according to the invention, the target speed for rejoining in level VCRP is equal to the maximum L/D ratio speed of the aircraft uprated by a first value V1 of between 5 and 15 knots and a target rejoining speed in downward trajectory VCRD is equal to the maximum operating speed VMO downrated by a second value V2 of between 3 and 10 knots. A knot is equal to 0.514 m/s. The value of the deviation threshold SVDEV is preferably greater than or equal to approximately 700 feet and, for example, equal to 700 feet. A foot, or ft, is the unit of measurement of the English system. An English foot (ft) is equal to 304.8 mm.

In other words, during the optimized catch-up, when the aircraft is constrained to follow a level, it slows down to the target rejoining speed in the level VCRP and when it is allowed to follow a downward trajectory, it adopts a downward trajectory by accelerating to the target rejoining speed in downward trajectory VCRD.

In the first embodiment of the method represented in FIG. 1, the step 12 during which the activation of an optimized mode for catching up on the vertical descent trajectory is authorized, is a step during which the crew is provided with a manual means for activating an optimized catch-up mode. In a second embodiment, the step 12 for authorizing the activation is a step 13 for activating the optimized mode for catching up on the vertical descent trajectory. In this embodiment, the optimized catch-up mode remains activated until the aircraft rejoins the vertical rejoining trajectory. Advantageously, the method comprises a step 15b for eliminating the means of activating the optimized catch-up mode, for example at the time of activation 13 of the optimized catch-up mode or when the aircraft rejoins the vertical descent trajectory. Thus, as long as the optimized catch-up mode is not activated and the aircraft has not rejoined the vertical descent trajectory, the activation means is available even if the vertical deviation VDEV drops back below the threshold SVDEV.

Advantageously, a manual means of deactivating the optimized catch-up mode is made available 15 to the crew. This step is advantageously implemented in case of activation 13. The deactivation means is advantageously available when the optimized catch-up mode is activated. Advantageously, in case of deactivation 16 of the optimized catch-up mode, the method comprises a step 17 for eliminating the means of deactivating the optimized catch-up mode. The deactivation 16 can be done manually by the crew or automatically when the aircraft rejoins the vertical descent trajectory (vertical descent profile) when the optimized catch-up mode is activated. The aircraft is considered to have rejoined the vertical descent trajectory when the vertical deviation VDEV is less than or equal to a predetermined tolerance threshold T. The manual deactivation 16 is done by means of the means of deactivating the optimized catch-up mode or by means of the means for configuring the aircraft in manual piloting mode (in which it is the crew that pilots the aircraft). In a variant, the method does not include any step 15 for providing a means of deactivating the optimized mode for catching up on the flight plan when the optimized catch-up mode is activated 13, the optimized catch-up mode is automatically deactivated upon rejoining the vertical descent trajectory.

In case of deactivation 16 of the optimized catch-up mode, or when the latter has not been activated, the aircraft is either piloted automatically or piloted by the FMS. The FMS pilots the aircraft according to the operating mode in which it is initially configured before activation 13 of the optimized catch-up mode. For example, the FMS pilots the aircraft in catch-up mode like in the state of the art described previously. If the crew of the aircraft deactivates 16 the optimized catch-up mode and the aircraft has not rejoined the vertical descent trajectory, there is, advantageously, a return to step 12 for provision of the activation means (this return is not represented in FIG. 5). The method may thus comprise a series of activations and deactivations of the optimized catch-up mode.

In a variant of the method according to the invention, the step 12 for authorizing the activation takes place when the vertical deviation VDEV exceeds the vertical deviation threshold SVDEV, only if the aircraft is configured in automatic piloting mode.

We will now explain more specifically the method according to the first embodiment of the invention, and notably the step 14 for optimized catching up on the vertical descent trajectory. We have diagrammatically represented in FIG. 3 an example of vertical descent trajectory (in bold lines) and vertical trajectory followed by the aircraft (thin unbroken line), according to the position P of the aircraft on the lateral trajectory between a horizontal start-of-descent position Pi and a horizontal end-of-descent position Pf. Between these positions, the aircraft is assumed to follow the lateral descent trajectory. The vertical descent trajectory is preceded by a flat vertical trajectory represented by dotted lines corresponding to the level followed by the aircraft during the cruising phase.

We assume that, during the cruising phase, the aircraft is configured in automatic piloting mode and that it is guided with a cruising speed Vc on a level (in horizontal trajectory), this level being called cruising level. At the reception position $P_r$, an air traffic control unit ATC sends to the FMS, 2, via the digital datalink DATALINK, 180, a flight instruction prohibiting it from adopting a downward trajectory until it has received a reverse instruction. In a variant, the crew sends instructions to the FMS by means of the means CONS, 250.

Figure 4:
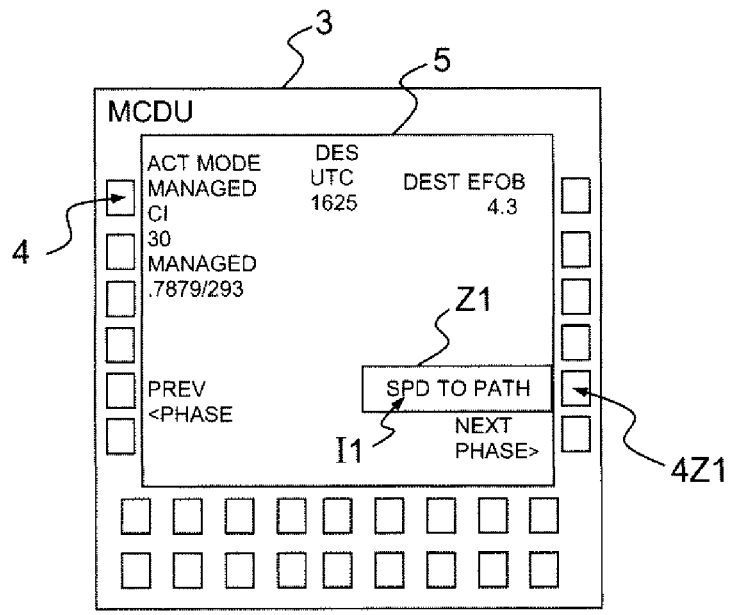
FIG. 4 represents an onboard console showing a screen displaying information according to which the optimized catch-up mode can be activated.

Thus, when the aircraft arrives at the initial descent position Pi, the FMS continues to guide the aircraft on the cruising level while following the lateral descent trajectory which causes a vertical deviation to be created between the aircraft and the vertical descent trajectory. The FMS regularly calculates the vertical deviation VDEV. Advantageously, the value of the deviation VDEV is displayed on the screen 5 of the console 3. When, at the position $P_0$, the vertical deviation VDEV exceeds the predetermined threshold SVDEV, the FMS makes available 12 to the crew a means of activating the optimized catch-up mode. This step comprises, for example, as represented in FIG. 4, a step for displaying, in a first area Z1 of the screen 5 of the console MCDU, 3, a first information item 11 (in this case "SPD TO PATH") informing the crew that it can activate an optimized catch-up mode. This step 12 also includes a step for configuring the area Z1 so that, when the crew presses the key 4Z1 of the keyboard 4 which is adjacent to the area Z1, that is to say, when the crew selects the area Z1 by means of the keyboard 4, the FMS's optimized catch-up operating mode is triggered.

Figure 5:
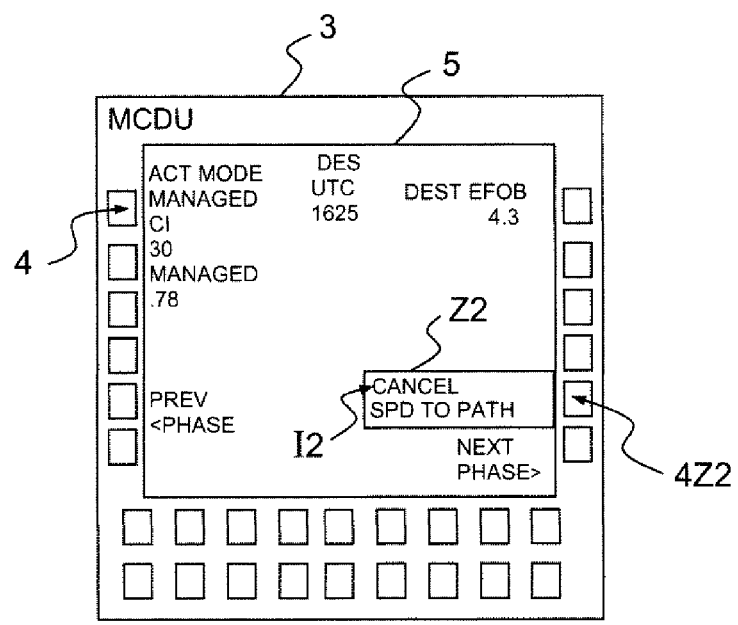
FIG. 5 represents an onboard console showing a screen displaying information according to which the optimized catch-up mode can be deactivated.

In case of activation 13 of the optimized catch-up mode, as represented in FIG. 5, step 15 for provision of a deactivation means comprises a step for displaying, in a second area Z2, a second information item 12 informing the pilot that he can deactivate the optimized catch-up mode (in this case "CANCEL SPEED TO PATH") and a step for configuring the second display area Z2 so that, when the crew presses the key 4Z2 of the keyboard 4 which is situated facing the area Z2, that is to say, when the crew selects the area Z2 by means of the keyboard 4, the FMS's optimized catch-up operating mode is deactivated. In the example represented in FIGS. 3 and 4, the first area Z1 is identical to the second area Z2, the information item 12 replaces the information 11. These areas may differ. It is conventionally the FMS which controls the display of information on the onboard console MCDU and that drives the configuration of the display areas. To sum up, the activation and deactivation means are included in the onboard console MCDU and interact with the FMS.

In a variant, the navigation aid device initially comprises means of activating and deactivating the optimized catch-up mode. The provision and, respectively, the elimination of the activation and deactivation means correspond to the unlocking and, respectively, the locking of the corresponding means. When a means is locked (unlocked) it does not communicate (it communicates) with the FMS.

It is assumed that the user activates the optimized catch-up mode at the horizontal position $P_1$. Between the position $P_1$ and the position $P_2$, the flight management system FMS, 2, guides the aircraft on the cruising level with a minimum thrust of the engines of the aircraft by considering a target rejoining speed in level that is little different from the maximum L/D ratio speed as defined previously. In other words, the aircraft, constrained to follow the cruising level, slows down to VCRP to limit the increase in time of the vertical deviation between the aircraft and the descent flight plan. The method according to the invention makes it possible to limit the deviation between the aircraft and the flight plan very early during the descent phase even before having begun to descend. The maximum L/D ratio speed is the speed which guarantees lift in the air with an acceptable margin protecting against stalling. Since this speed is very low, the aircraft has a wide margin for reducing speed on the level. In practice, regardless of the altitude concerned, the descent speed is greater than the maximum L/D ratio speed of the aircraft. A typical aircraft presents at 30 000 feet (ft) a descent speed of around 300 knots, and a maximum L/D ratio speed of around 190 to 200 knots. The target rejoining speed in the level is a little greater than the maximum L/D ratio speed so as to avoid, in an area of turbulence, the aircraft reaching a speed below the maximum L/D ratio speed which would cause the aircraft to stall.

Figure 3:
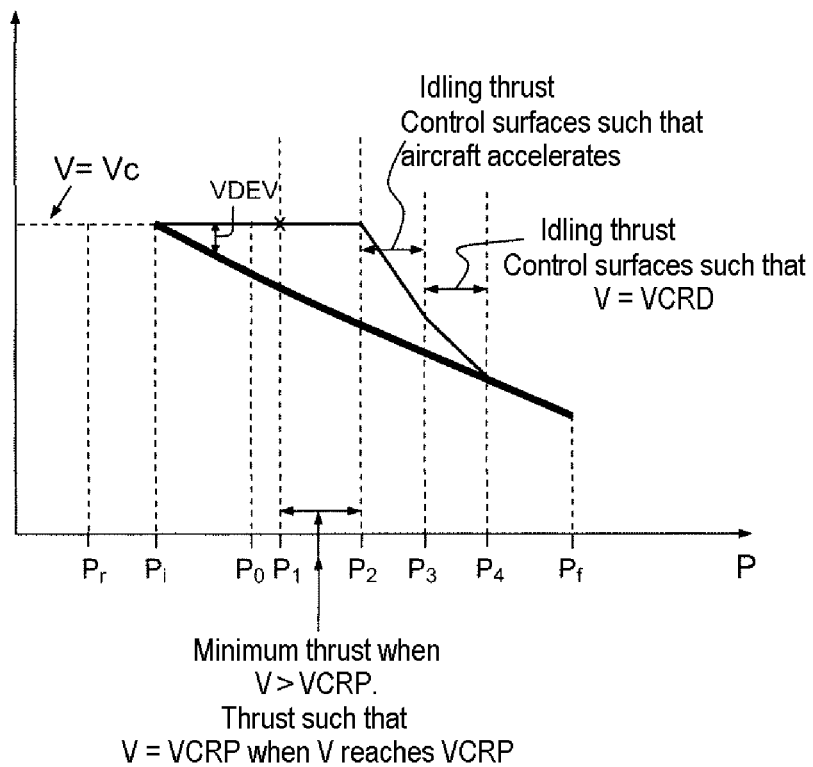
FIG. 3 represents an exemplary vertical trajectory followed by an aircraft according to its position on the lateral trajectory.

At the point $P_2$, the crew sends to the FMS, 2, a flight instruction authorizing the aircraft to adopt a downward trajectory, by means of the means CONS, 250. The FMS sets the thrust of the engines to idle and sets the pitch angle (or inclination relative to the ground) of the aircraft so that the aircraft makes up a target rejoining speed in descent VCRD by accelerating. In other words, as can be seen in FIG. 3, as long as the speed V is below the target descent speed VCRD, the aircraft has a significant pitch angle (significant inclination relative to the ground) and when the target descent speed VCRD is reached at the point $P_3$, the FMS adjusts the pitch angle of the aircraft to keep the speed V equal to the target rejoining speed in descent VCRD. The pitch angle responds to a closed guidance law loop, which servocontrols the speed of the aircraft to the target rejoining speed in descent VCRD a little below the maximum operating speed VMO. The maximum operating speed VMO is greater, whatever the altitude, than the descent speed of the aircraft. For example, the aircraft already cited presents, at 30 000 feet, a maximum operating speed VMO of around 350 knots. The aircraft can thus be allowed to accelerate over a wide speed range to a high target speed VCRD, which makes it possible to converge rapidly (that is to say, over a minimum distance) with the vertical trajectory of the descent flight plan. The target rejoining speed in downward trajectory VCRD is chosen to be a little less than the maximum operating speed VMO which is the maximum speed with which the aircraft is allowed to fly, and a check will be made to ensure that a gust of wind does not bring the aircraft above the maximum operating speed. To sum up, the descent VCRD and level VCRP rejoining speeds are chosen to be as far apart from one another as possible.

During the descent phase, the aircraft may follow a succession of levels and downward trajectories. However, the maximum L/D ratio speed decreases when the altitude of the aircraft decreases and the maximum operating speed VMO increases when the altitude of the aircraft decreases. Thus, in optimized catch-up mode, the deviation between the target rejoining speed in level VCRP and the target rejoining speed in downward trajectory VCRD increases when the aircraft descends. The aircraft has an acceleration reserve that becomes all the greater when the aircraft is at low altitude. At low altitude, the aeroplane can therefore fly with a greater slope because the range of speeds that can be used is greater (VMO is greater and the difference between the target descent and levels speeds is greater.)

When the aircraft rejoins the vertical descent trajectory at the point $P_4$, the optimized catch-up mode is automatically deactivated. The flight management system FMS, 2, eliminates 17, the means of deactivating the optimized catch-up mode (it deletes the information 12 and changes the configuration of the associated area Z2). The FMS guides the aircraft along the route associated with the descent flight plan. It adjusts the speed V to the speed determined by the descent flight plan. Thus, the aircraft rejoins the descent flight plan. This is a step for deceleration to the descent speed.

In a variant, the step 10 for calculating the deviation VDEV is coupled with a step for calculating the speed of variation of the deviation VVDEV and the deviation threshold SVDEV depends on the speed of variation of the deviation. Advantageously, the deviation threshold SVDEV decreases when the speed of variation of the deviation VVDEV increases. Thus, the pilot is given the possibility of more rapidly activating the optimized catch-up mode when the deviation increases rapidly. By activating the optimized catch-up mode right at the start of a level, the increase in the deviation is limited for a maximum amount of time and there is a greater reserve of kinetic energy available for rejoining the vertical descent trajectory.

Figure 6:
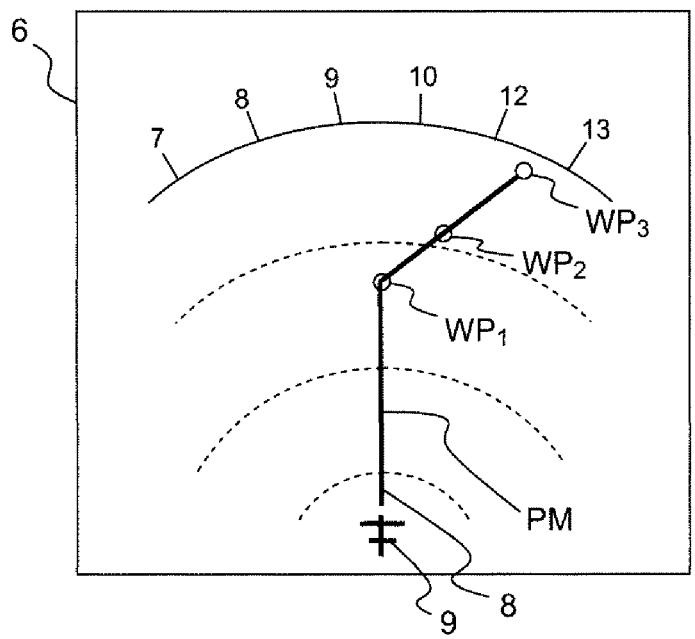
FIG. 6 represents an exemplary display on a navigation screen. From one figure to another, the same items are identified by the same references.

The lateral trajectory and the vertical trajectory of a descent flight plan conventionally pass through waypoints $WP_1$, $WP_2$, $WP_3$ which are altitude-constrained as represented in FIG. 6 which represents an exemplary display on the navigation screen ND, 6, displaying the lateral descent trajectory 8 and the position of the aircraft 9. A waypoint $WP_i$, altitude-constrained, is defined by a horizontal position and a vertical position (altitude) that are predefined.

In optimized catch-up mode, the FMS conventionally calculates, when the aircraft is level, a maximum horizontal start-of-slope position PM from which the aircraft must begin to adopt a downward trajectory to be able to rejoin the next waypoint in optimized catch-up mode. The FMS advantageously displays this position PM on the navigation screen ND, 6 in order to notify the pilot thereof, so that the pilot can make the appropriate arrangements if he reaches this point.

The invention claimed is:

1. A method for assisting in rejoining a vertical descent trajectory that an aircraft is assumed to have to follow, said method using a flight management system FMS embedded onboard the aircraft, comprising the following steps:
    calculation of a vertical deviation VDEV, in a vertical plane, between the aircraft and the vertical descent trajectory,
    comparison between the vertical deviation VDEV and a predetermined deviation threshold SVDEV,
    when the vertical deviation VDEV reaches the deviation threshold SVDEV, a step during which the activation of an optimized mode for catching up on the vertical descent trajectory is made possible, and
    if the optimized mode for catching up on the vertical descent trajectory is activated, piloting of the aircraft by the flight management system FMS in optimized catch-up mode, that is to say at minimum thrust with a target rejoining speed in level VCRP and a target rejoining speed in downward trajectory VCRD, the target rejoining speed in level VCRP being equal to the maximum L/D ratio speed of the aircraft uprated by a first value V1 of between 5 and 15 knots, and the target rejoining speed in downward trajectory VCRD being equal to the maximum operating speed VMO with which the aircraft is allowed to fly downrated by a second value V2 of between 3 and 10 knots, a knot being equal to 0.514 $ms^{-1}$.

2. The method for assisting in rejoining a vertical descent trajectory according to claim 1, in which the deviation threshold SVDEV is inversely proportional to the speed of variation of the deviation VVDEV.

3. The method for assisting in rejoining a vertical descent trajectory according to claim 1, in which the step during which the activation of an optimized catch-up mode is made possible is a step for providing the crew with a manual means of activating an optimized mode for catching up on the vertical descent trajectory.

4. The method for assisting in rejoining a vertical descent trajectory according to claim 1, further comprising at least one step for activating the optimized mode for catching up on the vertical descent trajectory.

5. The method for assisting in rejoining a vertical descent trajectory according to claim 4, in which, in case of activation, the method comprises a step for providing the crew with a manual means of deactivating the optimized catch-up mode.

6. The method for assisting in rejoining a vertical descent trajectory according to claim 4, in which the step during which the activation is made possible is a step for automatic activation of the optimized mode for catching up on the vertical descent trajectory.

7. The method for assisting in rejoining a vertical descent trajectory according to claim 4, further comprising at least a step for eliminating the manual activation means in case of activation of the optimized catch-up mode and/or a step for eliminating the manual activation means when the aircraft rejoins the vertical descent trajectory.

8. The method for assisting in rejoining a vertical descent trajectory according to claim 4, further comprising a step for automatically deactivating the optimized catch-up mode when the aircraft rejoins the vertical descent trajectory while the optimized catch-up mode is activated and/or at least one step for manually deactivating the optimized catch-up mode by means of a manual deactivation means.

9. The method for assisting in rejoining a vertical descent trajectory according to claim 8, in which in case of manual deactivation of the optimized mode for catching up on the vertical descent trajectory when the aircraft has not rejoined the vertical descent trajectory, there is a return to the step for provision of the manual activation means.

10. The method for assisting in rejoining a vertical descent trajectory according to claim 4, in which the step for providing the crew with a means of activating an optimized mode for catching up on the vertical descent trajectory comprises a step for displaying, in a first area of a screen of a data display and input console MCDU also comprising a keyboard, a first information item informing the crew that it can activate an optimized catch-up mode and a step for configuring the first area so that, when the crew selects the first area by means of the keyboard, the optimized catch-up mode is activated.

11. The method for assisting in rejoining a vertical descent trajectory according to claim 4, in which the step for providing a means of deactivating the optimized catch-up mode comprises a step for displaying, in a second area of a screen of a data display and input console MCDU also comprising a keyboard, a second information item informing the crew that it can activate an optimized catch-up mode, and a step for configuring the second area so that, when the crew selects the second area by means of the keyboard, the optimized catch-up mode is activated.

12. The method for assisting in rejoining a vertical descent trajectory according to claim 1, in which, if the optimized catch-up mode is activated, the flight management system FMS calculates, when the aircraft is level, a maximum horizontal start-of-slope position from which the aircraft must begin to adopt a downward trajectory to be able to rejoin a next waypoint WP of the flight plan, with altitude constraint, by being piloted in optimized mode for catching up on the vertical descent trajectory, and displays, on a navigation screen, the maximum start-of-slope position PM.

13. A method for assisting in rejoining a descent flight plan comprising a vertical descent trajectory and a lateral descent trajectory comprising the steps of a method for assisting in rejoining a vertical descent trajectory according to claim 1, in which, when the aircraft has rejoined the vertical descent trajectory, it comprises a step for decelerating to the descent speed.

14. A navigation aid device comprising means suitable for implementing a method according to claim 1.

* * * * *